(12) United States Patent
White et al.

(10) Patent No.: US 10,367,686 B2
(45) Date of Patent: Jul. 30, 2019

(54) AUTOMATICALLY DETECTING ROLES OF NODES IN LAYERED NETWORK TOPOLOGIES

(71) Applicant: LinkedIn Corporation, Sunnyvale, CA (US)

(72) Inventors: Russell I. White, Apex, NC (US); Shafagh Zandi, San Francisco, CA (US); Zaid A. Kahn, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/453,438

(22) Filed: Mar. 8, 2017

(65) Prior Publication Data
US 2018/0262392 A1 Sep. 13, 2018

(51) Int. Cl.
| | | |
|---|---|---|
| *H04L 12/28* | (2006.01) | |
| *H04L 12/24* | (2006.01) | |
| *H04L 12/753* | (2013.01) | |
| *H04L 12/58* | (2006.01) | |

(52) U.S. Cl.
CPC ...... *H04L 41/0806* (2013.01); *H04L 41/0893* (2013.01); *H04L 41/12* (2013.01); *H04L 45/48* (2013.01); *H04L 51/14* (2013.01); *H04L 51/18* (2013.01)

(58) Field of Classification Search
CPC . H04L 41/0806; H04L 41/0893; H04L 45/48; H04L 51/18
See application file for complete search history.

(56) References Cited

U.S. PATENT DOCUMENTS

| | | | |
|---|---|---|---|
| 6,507,562 B1* | 1/2003 | Kadansky | H04L 12/1877 370/216 |
| 9,286,047 B1* | 3/2016 | Avramov | G06F 8/61 |
| 2002/0101869 A1* | 8/2002 | Garcia-Luna-Aceves | H04L 45/025 370/389 |
| 2003/0216143 A1* | 11/2003 | Roese | G01S 5/02 455/456.1 |
| 2003/0235157 A1* | 12/2003 | Boivie | H04L 45/02 370/254 |
| 2007/0008949 A1* | 1/2007 | Balandin | H04L 45/02 370/351 |

(Continued)

OTHER PUBLICATIONS

Syngress Media (various authors/contributors), The CCNP Routing Study Guide, MacGraw-Hill publishing, copyrighted 2001, pp. 5 and 9.*

(Continued)

*Primary Examiner* — Stephen M D Agosta
(74) *Attorney, Agent, or Firm* — Park, Vaughan, Fleming & Dowler LLP; Chia-Hsin Suen (57) ABSTRACT

The disclosed embodiments provide a system that automatically detects a role of a node in a network with a layered topology. During operation, the system uses a local shortest path tree (SPT) for a node in a network with a layered topology to identify one or more additional nodes in the network that are farthest from the node. Next, the system compares the local SPT with a remote SPT for the one or more additional nodes to identify a position of the node in the layered topology. The system then outputs the position of the node for use in configuring the operation of the node in the network.

17 Claims, 5 Drawing Sheets

(56) References Cited

U.S. PATENT DOCUMENTS

| | | | |
|---|---|---|---|
| 2007/0274204 A1* | 11/2007 | Varada | H04J 3/085 |
| | | | 370/218 |
| 2008/0279103 A1* | 11/2008 | Yong | H04L 45/00 |
| | | | 370/235 |
| 2009/0265327 A1 | 10/2009 | Zou | |
| 2010/0272110 A1* | 10/2010 | Allan | H04L 45/02 |
| | | | 370/395.53 |
| 2012/0134361 A1* | 5/2012 | Wong | H04L 45/021 |
| | | | 370/392 |
| 2015/0200806 A1* | 7/2015 | Donley | H04L 45/58 |
| | | | 370/392 |
| 2016/0112252 A1* | 4/2016 | Notari | H04L 41/0843 |
| | | | 709/221 |
| 2016/0366061 A1 | 12/2016 | Renzullo et al. | |
| 2018/0176139 A1 | 6/2018 | Mortensen et al. | |

OTHER PUBLICATIONS

"Non Final Office Action Issued in U.S. Appl. No. 15/453,271", dated Apr. 19, 2019, 9 Pages.

\* cited by examiner

AUTOMATICALLY DETECTING ROLES OF NODES IN LAYERED NETWORK TOPOLOGIES

RELATED APPLICATION

The subject matter of this application is related to the subject matter in a co-pending non-provisional application by inventors Shafagh Zandi, Russell I. White, Zaid A. Khan and Vikas Kumar, entitled "Propagating Network Configuration Policies Using a Publish-Subscribe Messaging System," having serial number 15/453,271, and filing date Mar. 8, 2017.

BACKGROUND

Field

The disclosed embodiments relate to configuration of nodes in networks. More specifically, the disclosed embodiments relate to techniques for automatically detecting roles of nodes in layered network topologies for use in configuring the nodes.

Related Art

Switch fabrics are commonly used to route traffic within data centers. For example, network traffic may be transmitted to, from, or between servers in a data center using an access layer of "leaf" switches connected to a fabric of "spine" and/or "super-spine" switches. Traffic from a first server to a second server may be received at a first access switch to which the first server is connected, routed or switched through the fabric to a second access switch, and forwarded from the second access switch to the second server.

Within a switch fabric, switches are commonly configured for certain roles based on the locations of the switches in the fabric's topology. For example, access switches in a switch fabric may be configured with a different set of filters, QoS parameters, protocols, hardware configurations, interface configurations, and/or security attributes than core switches in the switch fabric. Moreover, configuration of network devices in switch fabrics typically incurs the overhead of manually identifying the role of each network device based on the location of the network device in the topology, followed by the transmission of a configuration policy to the network device based on the role of the network device. Consequently, management of switch fabrics may be improved by streamlining the role-based configuration of network devices in the switch fabrics.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
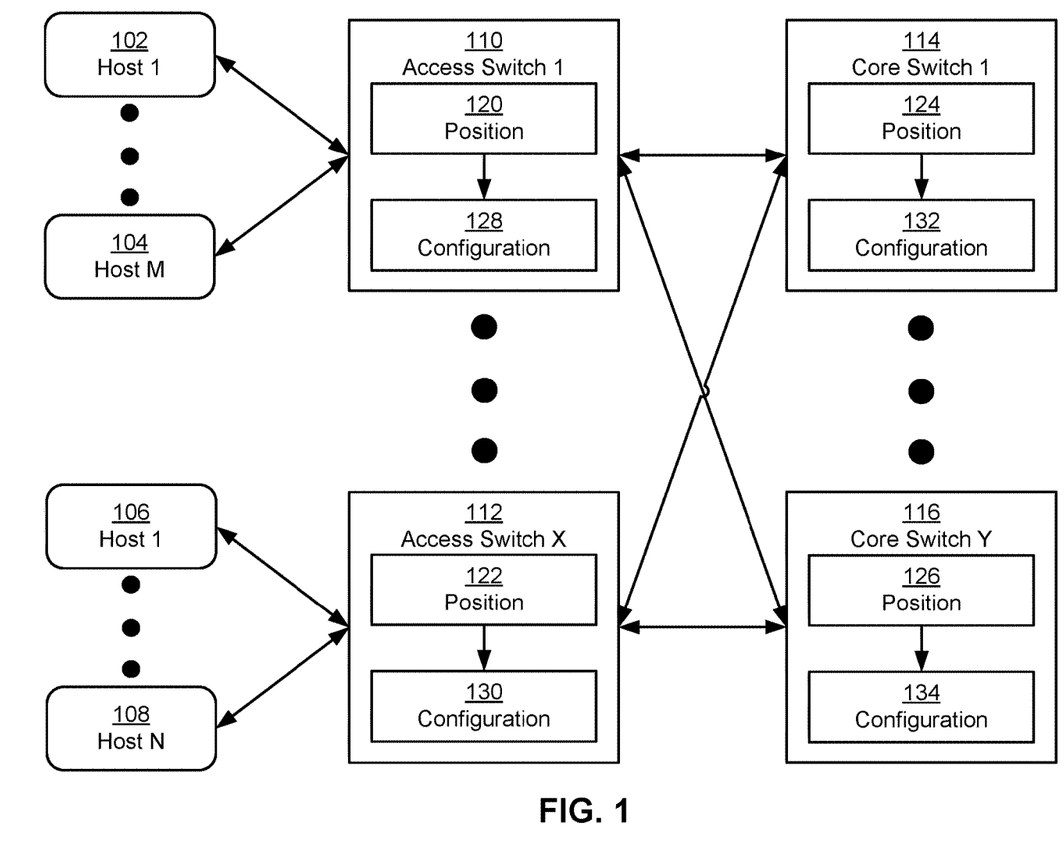
FIG. 1 shows a switch fabric in accordance with the disclosed embodiments.

The disclosed embodiments provide a method, apparatus, and system for improving configuration of a network. More specifically, the disclosed embodiments provide a method, apparatus, and system for automatically detecting the roles of nodes in networks with layered topologies. As shown in FIG. 1, a network may include a switch fabric with a layered topology, in which a number of access switches (e.g., access switch 1 110, access switch x 112) are connected to a set of core switches (e.g., core switch 1 114, core switch y 116) via a set of physical and/or logical links.

The switch fabric may be used to route traffic to, from, or between nodes connected to the switch fabric, such as a set of hosts (e.g., host 1 102, host m 104) connected to access switch 1 110 and a different set of hosts (e.g., host 1 106, host n 108) connected to access switch x 112. For example, the switch fabric may include an InfiniB and (InfiniBand™ is a registered trademark of InfiniB and Trade Association Corp.), Ethernet, Peripheral Component Interconnect Express (PCIe), and/or other interconnection mechanism among compute and/or storage nodes in a data center. Within the data center, the switch fabric may route north-south network flows between external client devices and servers connected to the access switches and/or east-west network flows between the servers.

Switches in the switch fabric may be connected in a hierarchical and/or layered topology, such as a leaf-spine topology, fat tree topology, Clos topology, and/or star topology. For example, each access switch may include a "top of rack" (ToR) switch, "end of row" switch, leaf switch, and/or another type of switch that provides connection points to the switch fabric for a set of hosts (e.g., servers, storage arrays, etc.). Each core switch may be an intermediate switch, spine switch, super-spine switch, and/or another type of switch that routes traffic among the connection points.

Because switches in different layers, tiers, or positions of the topology perform different sets of tasks, the switches may be configured for roles that are determined according to their positions in the topology. For example, the switch fabric may have leaf, spine, and/or super-spine switches that are configured to apply or use different sets of filters, quality of server (QoS) policies, access control lists, interface configurations, and/or routing policies. However, configuration of a switch or other network device typically requires manual identification of the device's position and/or role in the network, followed by the transmission of a configuration policy for the position or role to the network device.

In one or more embodiments, switches and/or other network devices in the switch fabric of FIG. 1 include functionality to automatically detect their positions 120-126 in the topology of the switch fabric. As described in further detail below with respect to FIG. 2, each network device may use a local shortest path tree (SPT) for the node to identify a set of nodes that is farthest away from the network device in the topology. The network device may then use the longest loop-free paths in the local SPT and a remote SPT for the set of nodes to calculate the network device's position as a numeric distance from the edge of the topology.

The network device may then use its position in the topology to facilitate the application of a configuration (e.g., configurations 128-134) for the network device. For example, the network device may output or transmit the position to a network administrator, allowing the network administrator to match the position to a configuration policy for a role of the network device, push the configuration policy to the network device, and/or otherwise deploy the configuration policy at the network device.

In lieu of or in addition to outputting its position in the topology to an administrator or other centralized controller, the network device may automatically obtain and apply the configuration based on its position in the topology. For example, switches in the switch fabric may include programmable hardware components that are capable of running custom network operating systems and application-layer components. The switches may thus be configured to execute tools or services that are available outside of the feature set of conventional switches, such as agents that allow the switches to publish and subscribe to messages through a publish-subscribe messaging system. In turn, each switch may subscribe to a topic associated with the position in the publish-subscribe messaging system and automatically receive, through the subscription, messages containing a configuration policy for the position. The switch may then apply the configuration policy by converting a serialized form of the configuration policy in the messages into one or more formats that can be used by the corresponding processing layers (e.g., network stack layers) in the switch.

Using a publish-subscribe messaging system to perform automatic configuration of network nodes is described in a co-pending non-provisional application by inventors Shawn Zandi, Russell White, Zaid Ali Khan and Vikas Kumar, entitled "Propagating Network Configuration Policies Using a Publish-Subscribe Messaging System," having serial number TO BE ASSIGNED, and filing date TO BE ASSIGNED, which is incorporated herein by reference.

Figure 2:
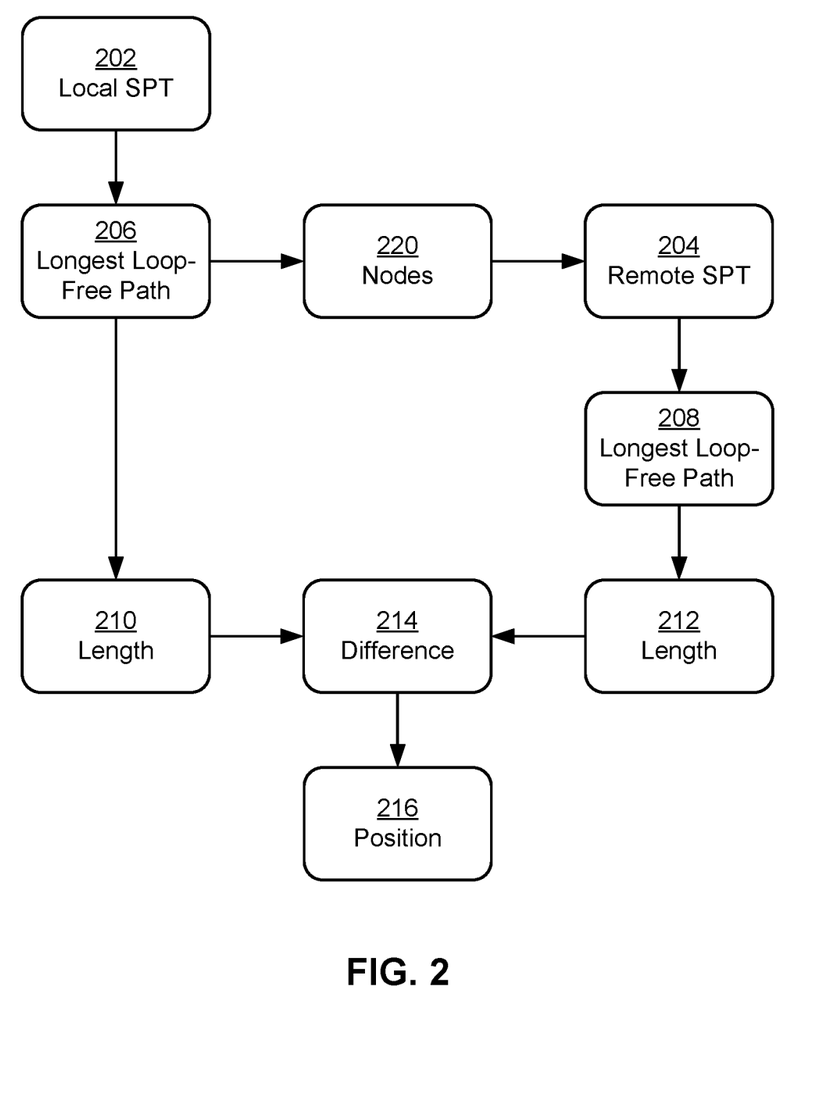
FIG. 2 shows the automatic detection of a position of a node in a layered network topology in accordance with the disclosed embodiments.

FIG. 2 shows the automatic detection of a position 216 of a node in a layered network topology in accordance with the disclosed embodiments. The node may be a switch, router, server, and/or other network device that performs filtering, routing, and/or other processing of network traffic received at the node. As mentioned above, the position of the node may be used to facilitate configuration of the node to perform a certain role in the network.

To determine position 216, the node may obtain a local SPT 202 for the node. For example, the node may use a link state protocol such as Open Shortest Path First (OSPF) and/or Intermediate System to Intermediate System (IS-IS) to transmit link state messages with other nodes in the network and construct a topology of the network. The node may then use the topology to calculate the local SPT as a tree of shortest paths from the node to all other nodes in the network. Alternatively, the local SPT may be calculated by another node and/or component and transmitted to the node for use in calculating its position in the topology.

Next, the node may identify a longest loop-free path 206 in local SPT 202 and use longest loop-free path 206 to identify one or more nodes 220 that are farthest from the node in the topology. For example, the node may obtain longest loop-free path 206 as a path in local SPT 202 with the most hops from the node to another node in the network. The node may then identify the other node and/or additional nodes 220 that are farthest from the node as endpoints in longest loop-free path 206.

After one or more nodes 220 that are farthest from the node are identified, the node may obtain a remote SPT 204 for nodes 220. For example, the node may calculate remote SPT 204 as a tree of shortest paths from a selected node in nodes 220 to all other nodes in the network. Alternatively, the node may request remote SPT 204 as a local SPT from the selected node and/or obtain remote SPT 204 from another source.

The node may identify a longest loop-free path 208 in remote SPT 204 as a path in remote SPT 204 with the most hops from the root of remote SPT 204 (i.e., a node that is farthest away from the node) to another node in the network. After longest loop-free path 208 is identified, the node may use a length 210 of longest loop-free path 206 and a length 212 of longest loop-free path 208 to determine position 216. More specifically, the node may use a difference 214 between the two lengths 210-212 as the distance of the node from the edge of the topology. If longest loop-free paths 206-208 have equal lengths 210-212, difference 214 may be calculated as 0, indicating that the node is on the edge of the topology. If longest loop-free paths 206-208 have non-equal lengths 210-212, difference 214 may represent the number of hops and/or layers between the node and the edge of the topology. By identifying position 216 as the separation between the node and the edge of the topology, the node may streamline the configuration of a role associated with the position, as described above.

The node may also, or instead, determine the position of nodes 220 and/or other nodes in the topology. For example, the node may generate local and remote SPTs from the perspectives of the other nodes and use the lengths of the longest loop-free paths in the local and remote SPTs to calculate differences between the lengths as the positions of the nodes in the topology. As a result, the position of each node in the topology may be calculated by the same node and/or by a different node in the network.

Figure 3:
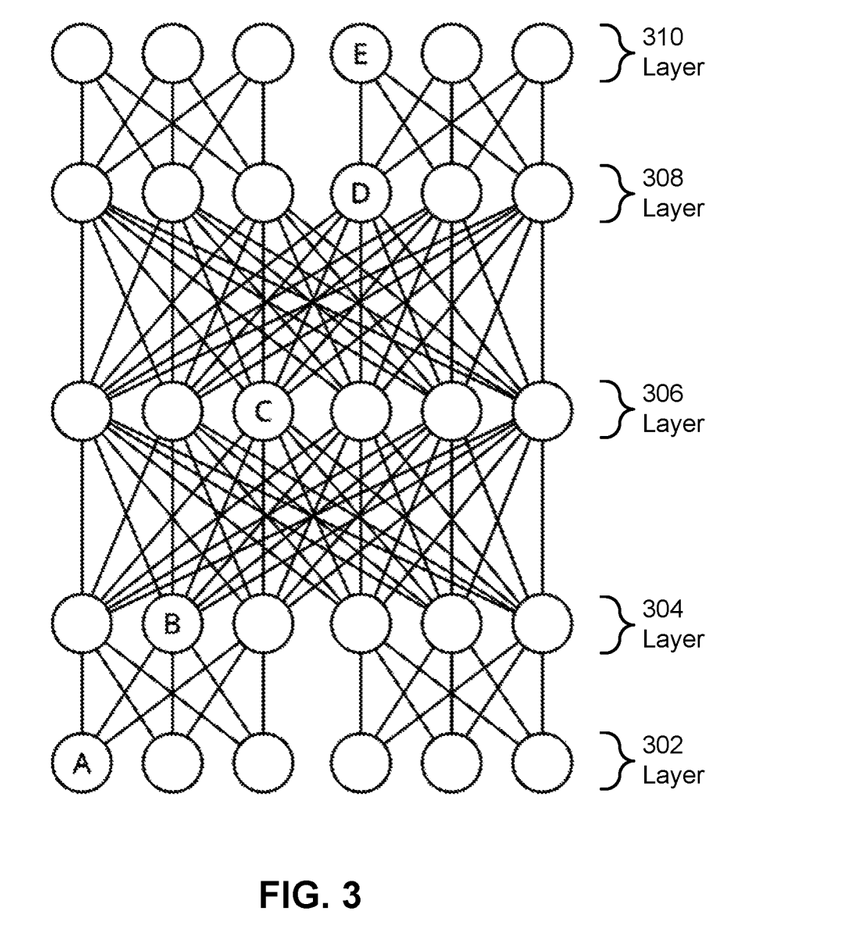
FIG. 3 shows an exemplary layered network topology in accordance with the disclosed embodiments.

The detection technique of FIG. 2 may be used with the exemplary layered network topology of FIG. 3, which includes five layers 302-310 of nodes connected in a Clos network. Layers 302 and 310 may include leaf switches and/or other types of nodes at the edge of the topology, layers 304 and 308 may include spine switches and/or other types of nodes that are one layer away from the edge, and layer 306 may include core switches, super-spine switches, and/or other types of nodes that are at the center of the topology and two layers away from the edge.

The network of FIG. 3 may be built using devices with the same physical parts that are subsequently configured to carry out different roles based on the positions of the devices in the network's topology. For example, nodes at the edge of the topology (i.e., nodes in layers 302 and 310) may have interfaces that are connected to hosts and/or external networks, as well as interfaces connected to nodes that are one hop away from the edge (i.e., nodes in layers 304 and 308). In turn, nodes that are one hop away from the edge may have interfaces with nodes at the edge of the topology and nodes at the center of the topology, and nodes at the center of the topology may only have interfaces with nodes that are one hop away from the edge. As a result, nodes in layers that are different distances from the edge if the topology may be configured with different sets of filters, protocols, access control lists, interface configurations, security policies, QoS policies, routing policies, and/or other types of configuration policies.

To streamline the configuration of nodes at different positions in the topology, the position of each node in the topology may automatically be detected by the node and/or another component in the network using a local SPT for the node and a remote SPT for another node that is farthest from the node in the topology. For example, node A in layer 302 may use a local SPT to identify node E in layer 310 as farthest from node A. Node A may generate or obtain a remote SPT for node E and determine that the longest loop-free paths in the local and remote SPTs both have a length of five, thus indicating that node A and node E are both at the edge of the topology.

In another example, node B in layer 304 may use a local SPT to identify node E in layer 310 as farthest from node B. Node B may generate or obtain a remote SPT for node E and determine that the longest loop-free paths in the local and remote SPTs have a difference in length of one. Similarly, node D in layer 308 may identify node A as farthest from node D and use the SPTs for nodes D and A to calculate the difference in lengths of the loop-free paths in the SPTs as 1. Thus, the positions of nodes B and D are both one away from the edge of the topology.

In a third example, node C in layer 306 may use a local SPT to identify node A in layer 302 as farthest from node C. Node C may generate or obtain a remote SPT for node A and determine that the longest loop-free paths in the local and remote SPTs have a difference in length of 2. Consequently, node C may identify its position as two away from the edge of the topology.

Nodes in the network may then be configured based on their positions in the topology. For example, nodes in layers 302 and 310 may subscribe to a first topic in a publish-subscribe messaging system that is associated with configuration of edge nodes in the network. Nodes in layers 304 and 308 may subscribe to a second topic that is associated with configuration of nodes that are one away from the edge, and nodes in layer 306 may subscribe to a third topic that is associated with configuration of nodes that are two away from the edge. In turn, each node may receive one or more messages containing a configuration policy that is tailored to the node's position in the topology and apply the configuration policy to one or more processing or network stack layers at the node.

Figure 4:
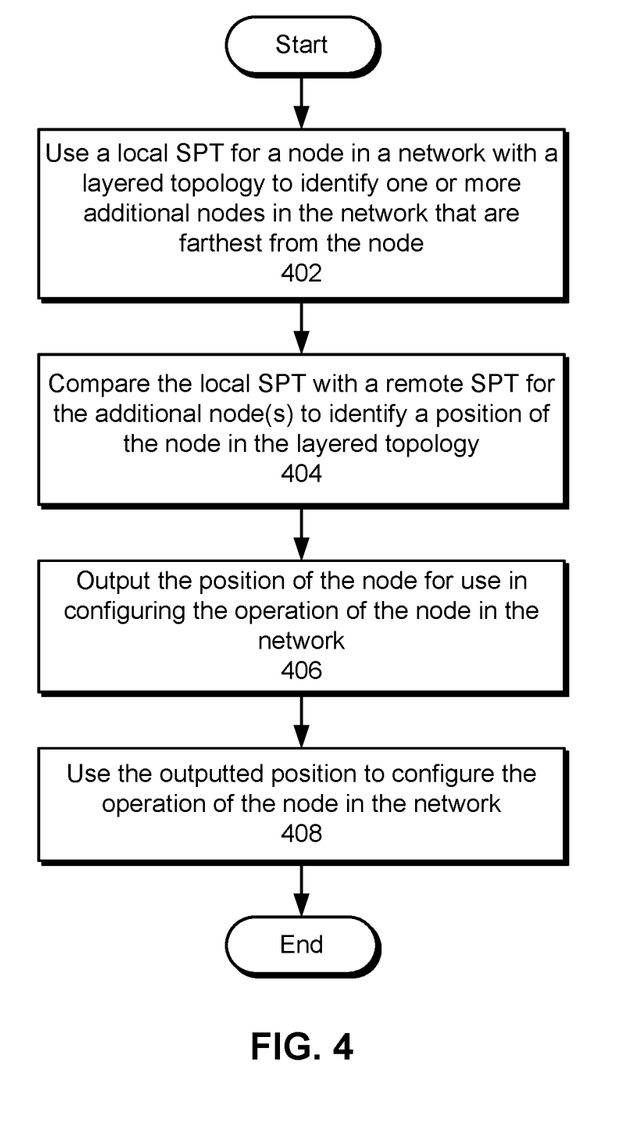
FIG. 4 shows a flowchart illustrating a process of detecting a position of a node in a network with a layered topology in accordance with the disclosed embodiments.

FIG. 4 shows a flowchart illustrating a process of detecting a position of a node in a network with a layered topology in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a local SPT for a node in a network with a layered topology is used to identify one or more additional nodes in the network that are farthest from the node (operation 402). The local SPT may be generated by searching a topology of the network that is built by the node using a routing protocol. Nodes that are farthest away from the node may then be identified using one or more longest loop-free paths in the local SPT.

Next, the local SPT is compared with a remote SPT for the additional node(s) to identify a position of the node in the layered topology (operation 404). For example, the position of the node may be calculated as the difference in length between the longest loop-free path in the local SPT and the longest loop-free path in the remote SPT, which represents the distance of the node from the edge of the layered topology.

The position of the node is then outputted for use in configuring the operation of the node in the network (operation 406). For example, the position may be stored in metadata for the node and/or transmitted to a central server or administration point for the network. Finally, the outputted position is used to configure the operation of the node in the network (operation 408). For example, the position may be used to identify a role of the node in the network and obtain a configuration policy for the node. The configuration policy may specify a protocol, filter, access control list, interface configuration, QoS policy, routing policy, and/or other policy for configuring the execution of the node.

An administrator of the network may select the configuration policy based on the node's position or role and transmit the configuration policy to the node. Alternatively, the node may subscribe to a topic associated with the role in a publish-subscribe messaging system, receive the configuration policy in one or more messages assigned to the topic, and automatically apply the configuration policy to one or more processing layers. In other words, the node may minimize overhead associated with manually identifying the roles of multiple nodes in a network and pushing configuration policies for the roles to individual nodes.

Figure 5:
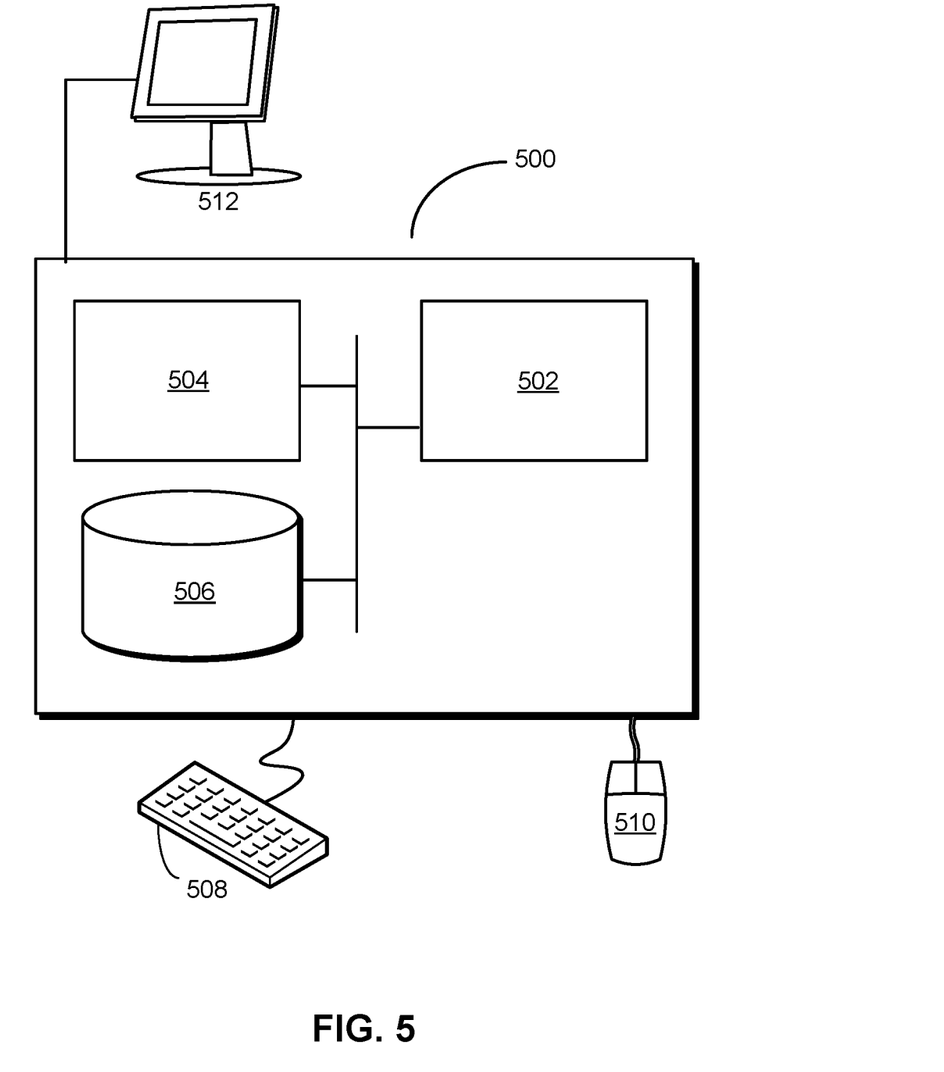
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for automatically detecting a role of a node in a network with a layered topology. The system may use a local SPT for a node in a network with a layered topology to identify one or more additional nodes in the network that are farthest from the node. Next, the system may compare the local SPT with a remote SPT for the one or more additional nodes to identify a position of the node in the layered topology. The system may then output the position of the node for use in configuring the operation of the node in the network.

In addition, one or more components of computer system 500 may be remotely located and connected to the other components over a network. Portions of the present embodiments may also be located on different nodes of a distributed system that implements the embodiments. For example, the present embodiments may be implemented using a cloud computing system that automatically detects the position of each node in a remote network with a layered topology and outputs the position for use in configuring the node for a certain role in the network.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   identifying, by a node in a network with a layered topology, using a local shortest path tree (SPT), one or more additional nodes in the network that are farthest from the node;
   calculating a position of the node using a difference in length between a longest loop-free path in the local SPT and an additional longest loop-free path in a remote SPT, wherein the difference in length represents a number of layers between the node and the edge of the layered topology; and
   configuring operation of the node in the network by:
      identifying a role of the node based on the calculated position and a layer in which the node appears in the layered topology;
      obtaining a configuration policy for the role at the node; and
      configuring the node according to the configuration policy.

2. The method of claim 1, wherein using the local SPT to identify the one or more additional nodes in the network that are farthest from the node comprises:
   identifying the one or more additional nodes from the longest loop-free path in the local SPT.

3. The method of claim 1, wherein the difference in length represents a distance of the node from an edge of the layered topology.

4. The method of claim 1, wherein obtaining the configuration policy for the role at the node comprises:
   subscribing the node to a topic associated with the role in a publish-subscribe messaging system; and
   receiving the configuration policy in one or more messages assigned to the topic.

5. The method of claim 1, wherein the role is at least one of:
   a leaf;
   a spine; and
   a super-spine.

6. The method of claim 1, wherein the configuration policy comprises at least one of:
   a protocol;
   a filter;
   an access control list;
   an interface configuration;
   a quality of service (QoS) policy; and
   a routing policy.

7. The method of claim 1, further comprising:
   outputting the calculated position of the node.

8. An apparatus, comprising:
   one or more processors; and
   memory storing instructions that, when executed by the one or more processors, cause the apparatus to:
      identify, by a node in a network with a layered topology, using a local shortest path tree (SPT), one or more additional nodes in the network that are farthest from the node;
      calculate a position of the node using a difference in length between a longest loop-free path in the local SPT and an additional longest loop-free path in a remote SPT, wherein the difference in length represents a number of layers between the node and the edge of the layered topology; and
      configure operation of the node in the network by:
         identifying a role of the node based on the outputted position and a layer in which the node appears in the layered topology;
         obtaining a configuration policy for the role at the node; and
         configuring the node according to the configuration policy.

9. The apparatus of claim 8, wherein using the local SPT to identify the one or more additional nodes in the network that are farthest from the node comprises:
   identifying the one or more additional nodes from the longest loop-free path in the local SPT.

10. The apparatus of claim 8, wherein obtaining the configuration policy for the role at the node comprises:
    subscribing the node to a topic associated with the role in a publish-subscribe messaging system; and
    receiving the configuration policy in one or more messages assigned to the topic.

11. The apparatus of claim 8, wherein the memory further stores instructions that, when executed by the one or more processors, cause the apparatus to:
    output the calculated position of the node.

12. The apparatus of claim 8, wherein the role is at least one of:
    a leaf;
    a spine; and
    a super-spine.

13. A system, comprising:
    a network comprising a set of nodes connected by a set of links; and
    a node in the set of nodes, wherein the node comprises a non-transitory computer-readable medium comprising instructions that, when executed, cause the system to:
       identify, by a node in a network with a layered topology, using a local shortest path tree (SPT), one or more additional nodes in the network that are farthest from the node;
       calculate a position of the node using a difference in length between a longest loop-free path in the local SPT and an additional longest loop-free path in a remote SPT, wherein the difference in length represents a number of layers between the node and the edge of the layered topology; and
       configure operation of the node in the network by:

identifying a role of the node based on the outputted position and a layer in which the node appears in the layered topology;

obtaining a configuration policy for the role at the node; and configuring the node according to the configuration policy.

14. The system of claim 13, wherein using the local SPT to identify the one or more additional nodes in the network that are farthest from the node comprises:

identifying the one or more additional nodes from the longest loop-free path in the local SPT.

15. The system of claim 13, wherein the non-transitory computer-readable medium of the node further comprises instructions that, when executed, cause the system to:

output the calculated position of the node.

16. The system of claim 13, wherein obtaining the configuration policy for the role at the node comprises:

subscribing the node to a topic associated with the role in a publish-subscribe messaging system; and receiving the configuration policy in one or more messages assigned to the topic.

17. The system of claim 13, wherein the role is at least one of:

a leaf;

a spine; and a super-spine.

\* \* \* \* \*